(12) United States Patent
Chang et al.

(10) Patent No.: US 6,387,566 B1
(45) Date of Patent: May 14, 2002

(54) BATTERY WITH LAMINATED INSULATOR/ METAL/INSULATOR CASE

(75) Inventors: Youn-han Chang, Kyungki-do; Young-ik Chang, Asan; Ha-young Lee, Cheonan, all of (KR)

(73) Assignee: Samsung SDI Co., Ltd., Suwon (KR)

( * ) Notice: Subject to any disclaimer, the term of this patent is extended or adjusted under 35 U.S.C. 154(b) by 0 days.

(21) Appl. No.: 09/538,894

(22) Filed: Mar. 30, 2000

(30) Foreign Application Priority Data

Mar. 31, 1999 (KR) .............................................. 99-11259

(51) Int. Cl.[7] .......................... H01M 6/00; H01M 6/42; H01M 2/10

(52) U.S. Cl. .......................... 429/161; 429/90; 429/94; 429/96; 29/623.1

(58) Field of Search .......................... 429/161, 96, 100, 429/192, 90, 94; 29/623.1, 623.3, 623.5; 370/150

(56) References Cited

U.S. PATENT DOCUMENTS

| 4,670,664 | A | * | 6/1987 | Hara | 307/150 |
|---|---|---|---|---|---|
| 4,996,128 | A | * | 2/1991 | Aldecoa et al. | 429/153 |
| 5,580,679 | A | * | 12/1996 | Tanaka | 429/185 |
| 5,631,101 | A | * | 5/1997 | Amero, Jr. | 429/90 |
| 5,656,876 | A | * | 8/1997 | Radley et al. | 307/150 |
| 5,849,044 | A | * | 12/1998 | Tuttle | 29/623.2 |
| 5,907,472 | A | * | 5/1999 | Farahmandi et al. | 361/502 |
| 6,021,040 | A | * | 2/2000 | Suzuki et al. | 361/514 |
| 6,225,778 | B1 | * | 7/2000 | Hayama et al. | 320/112 |
| 6,203,938 | B1 | * | 3/2001 | Yoshida et al. | 429/94 |

* cited by examiner

*Primary Examiner*—Tom Dunn
*Assistant Examiner*—L. Edmondson
(74) *Attorney, Agent, or Firm*—Leydig, Voit & Mayer, Ltd.

(57) ABSTRACT

A polymer lithium ion battery has an aluminum foil case, both surface of which are coated with a thin layer of an insulating polymer and portions of the polymer on the periphery of the case are removed so that the exposed regions can function as battery terminals. Portions of the polymer on the inner surface of the case are removed so that electrode sheets can be electrically connected to the battery terminals.

6 Claims, 4 Drawing Sheets

BATTERY WITH LAMINATED INSULATOR/METAL/INSULATOR CASE

BACKGROUND OF THE INVENTION

1. Field of the Invention

The present invention relates to a battery, and more particularly to a rechargeable-battery case.

2. Description of the Related Art

A conventional polymer lithium-ion battery 10 is shown in FIGS. 1A, 1B, and 2. The conventional polymer lithium ion battery 10 includes a case 11 for accommodating an electrode assembly 15. As shown in FIG. 1B, the electrode assembly includes positive electrode sheets 12, negative electrode sheets 13 and separators 14 interposed therebetween. The case 11 includes an upper case body 11a and a lower case body 11b having the same shape. Each of the positive and negative electrode sheets is electrically coupled to a connector 16. The connector 16 is further coupled to an external terminal 18 which is drawn out from the case 11 in an extended manner between the upper and lower case bodies 11a and 11b before they are hermetically sealed at their peripheries by a thermal pressing process. The peripheral surfaces, coated with a heat-activated adhesive, of the upper and lower case bodies 11a and 11b are contacted and pressed to hermetically seal the electrode assembly 15 inside the case 11 with the terminals 18 placed between the peripheral edges. However, since the external terminals 18 have a certain thickness, it is probable that peripheral surfaces just around the terminals 18 are not airtightly adhered. In other words, there will exist gaps, though possibly very small, around the terminals 18 between the upper case body 11a and the lower case body 11b. If the electrolyte inside the case 11 should leak out from around the terminals 18, both the battery 10 and a device in which the battery 10 is installed may be damaged.

SUMMARY OF THE INVENTION

To solve the above problem, it is an objective of the present invention to seal a battery case. The case is comprised of two portions, each portion having a centrally recessed region to receive an electrode assembly where the depth of the recess is about one half the thickness of the electrode assembly and a peripheral region as the seal surface with a corresponding region of the other portion. Each portion is made of aluminum coated with an insulating material. Rather than providing separate positive and negative terminals electrically coupled to the positive electrodes and negative electrodes, respectively, the battery case itself serves as terminals by electrically connecting the inner surfaces to the electrode sheets and some outer surface portions are made free of an insulating material so that they would function as terminals to which corresponding terminals of a device contact.

A second objective of the present invention is to minimize the size of the battery, which is achieved automatically since the terminals are not necessary in the present invention, unlike in the prior art.

BRIEF DESCRIPTION OF THE DRAWINGS

The above objectives and advantages of the present invention will become more apparent by describing in detail a preferred embodiment thereof with reference to the attached drawings in which:

FIG. 1B shows a detail thereof;

DESCRIPTION OF THE PREFERRED EMBODIMENTS

Figure 1A:
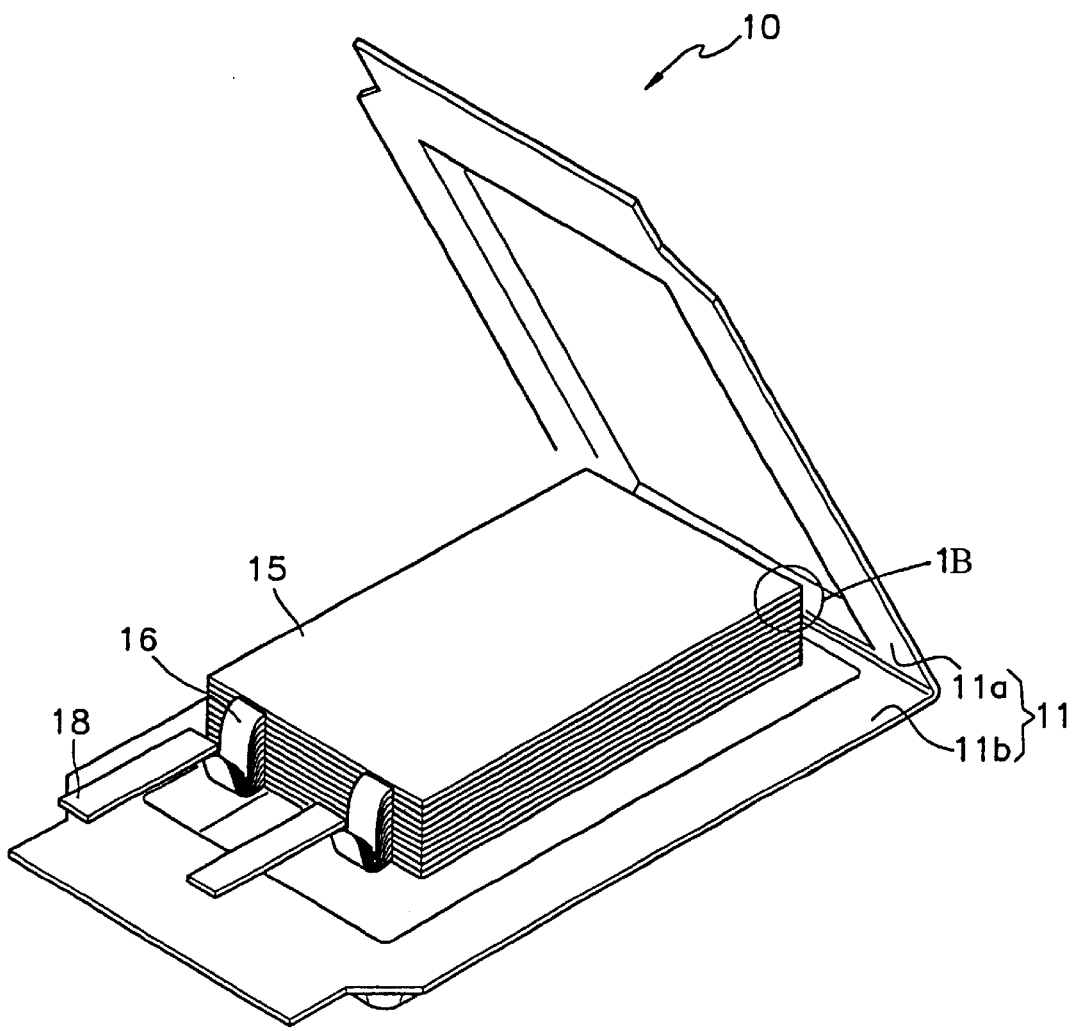
FIG. 1B shows the state of a conventional polymer lithium ion battery before its two halves are joined.
Figure 1B:
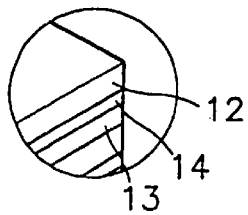
Figure 2:
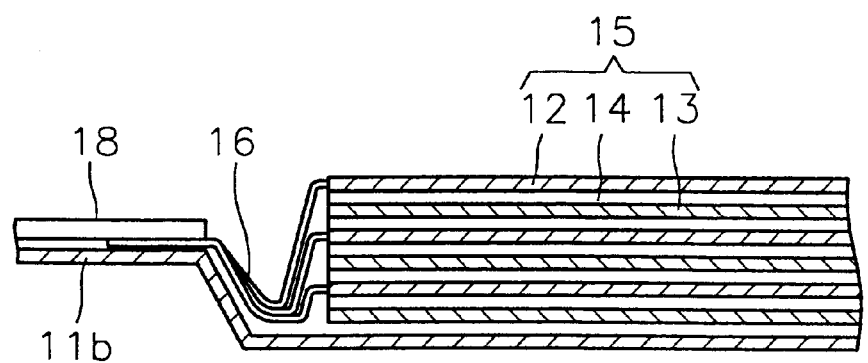
FIG. 2. is a cross section of the conventional polymer lithium ion battery shown in FIG. 1.
Figure 3A:
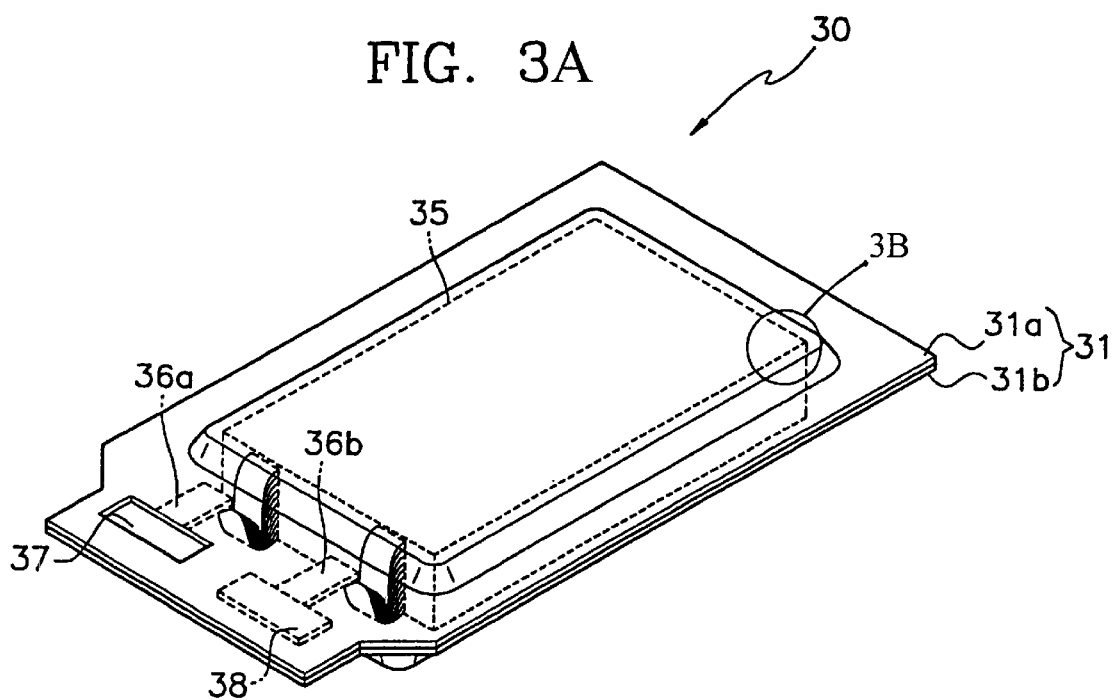
FIG. 3A. shows a polymer lithium ion battery according to the present invention
Figure 3B:
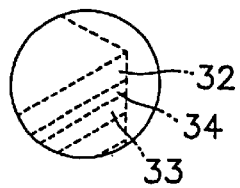
FIG. 3B shows a detail thereof.
Figure 4A:
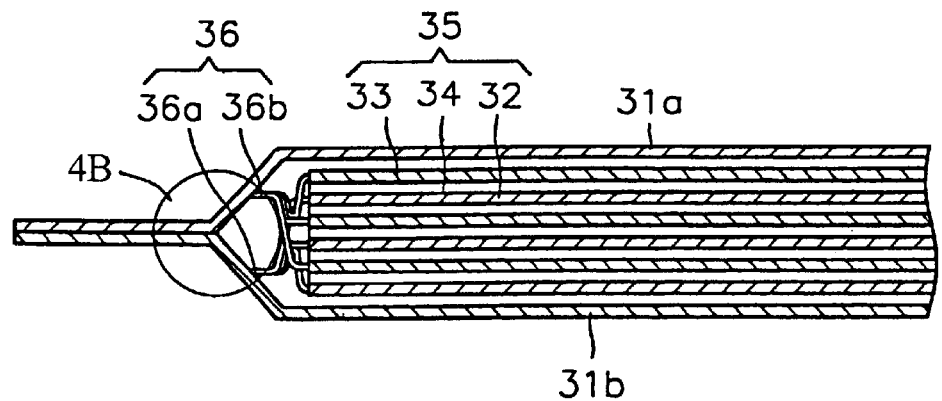
FIGS. 4A and 4B are a cross section and a detailed cross section of the polymer lithium ion battery according to the present invention.
Figure 4B:
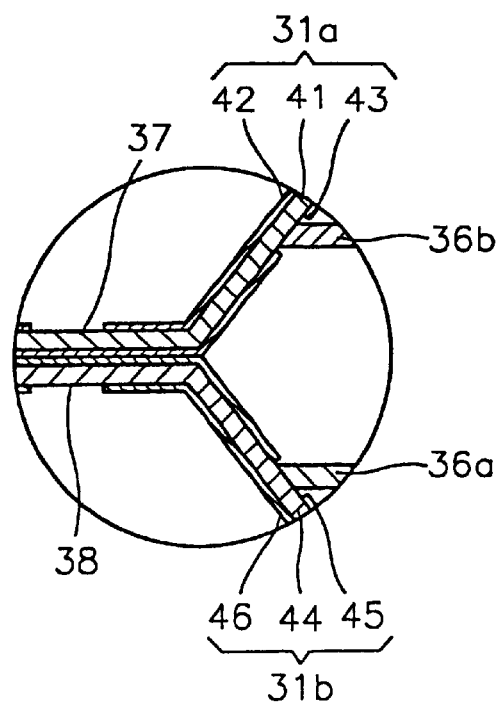

FIG. 3A shows a battery 30 according to the present invention. As shown in FIG. 3B, an electrode assembly 35 having positive electrode sheets 32, negative electrode sheets 33 layered alternately with separators 34 interposed between each pair of positive and negative sheets 32, 33, is housed in a case 31, which is comprised of an upper case body 31 a and a lower case body 31b having the same shape. Each case body has a recess in the center to receive the electrode assembly 35. The depth of the recess is about half the thickness of the electrode assembly 35 so that, when the upper and lower case bodies 31a and 31b are put together, the recesses will create enough space to enclose the electrode assembly 35. The periphery of one case body of the case 31 serves as an adhering surface with the corresponding periphery of the other case body. Referring to FIG. 4, each of the upper and lower case bodies 31a and 31b is comprised of a thin conductive foil 41, such as an aluminum foil, both surfaces of which are coated with electrically insulating layers 42, 43, 45 and 46 made of polymer. Hereinafter, a description will be given as to an embodiment employing aluminum as conductive layer. However, the present invention is not limited to the use of aluminum but other conductive foil can be used.

From a predetermined area on the inner surface of each case body is removed the insulating material so that one end of each of the connectors 36a and 36b can be welded to the aluminum layers 41 and 44, respectively, of the case 31 for electrical connection.

The other end of each of the connectors 36a and 36b is connected to either the positive or negative electrode sheets 32 and 33. As a result, the first case body of the case 31 has the same voltage potential of one polarity, positive for example, while the second case body has the same voltage potential of the other polarity.

From a predetermined area on the outer surface of each half case body the insulating material is also removed to expose the aluminum layer. The area with no insulating material removed therefrom may take various shapes, such as a circle, square, or rectangle. Aluminum-exposed regions 37 and 38 of the case 31 serve as battery terminals since, as mentioned earlier, the aluminum layers 41 and 44 have the same voltage potential as that of the electrode sheets 32 and 33 because the aluminum layers 41 and 44 are, in turn, electrically connected to the positive and negative electrode sheets 32 and 33 inside the case 31 via the connectors 36a and 36b. The exposed aluminum layer 38 on the lower case body 31b serves as a positive terminal and the exposed aluminum layer 37 on the upper case body 31a serves as a negative terminal. The thus-made upper case body 31a and the lower case body 31b are joined at their peripheries, additionally coated with a heat activated adhesive, by a thermal pressing process, hermetically sealing the electrode assembly 35 in the case 31 and thus preventing leakage of electrolyte.

Unlike the prior art, the present invention has no terminals interposed between the adhering peripheral surfaces of two case bodies. This leads to air-tight and leak-proof sealing of an electrode assembly 35 in the case 31.

What is claimed is:

1. A battery comprising:
    a plurality of positive electrode sheets and a plurality of negative electrode sheets;
    a first connector electrically connecting the plurality of positive electrode sheets together;
    a second connector electrically connecting the plurality of negative electrode sheets together;
    a case including an upper case body and lower case body, each of the upper and lower case bodies comprising an electrically conducting metal foil sandwiched between electrically insulating polymer layers, at least one of the upper and lower case bodies including a recess that receives at least part of the plurality of positive and negative electrode sheets and a peripheral flange at which the upper and lower case bodies are sealed to each other, wherein
        the electrically conducting metal foil of the upper case body is exposed at a first region, inside the case, where part of one of the insulating polymer layers is missing, and the first connector is electrically connected to the electrically conducting metal foil of the upper case body at the first region,
        the electrically conducting metal foil of the upper case body is exposed, at a second region, on an outside surface of the upper case body, where part of one of the electrically insulating polymer layers is missing, providing a first terminal of the battery,
        the electrically conducting metal foil of the lower case body is exposed at a third region, inside the case, where part of one of the insulating polymer layers is missing, and the second connector is electrically connected to the electrically conducting metal foil of the lower case body at the third region, and
        the electrically conducting metal foil of the lower case body is exposed, at a fourth region, on an outside surface of the lower case body, where part of one of the electrically insulating polymer layers is missing, providing a second terminal of the battery.

2. The battery according to claim 1, wherein both of the upper case body and the lower case body include recesses receiving parts of the plurality of positive electrode sheets and negative electrode sheets.

3. The battery according to claim 2, wherein each of the upper and lower case bodies includes a peripheral flange at which the upper and lower case bodies are sealed to each other.

4. The battery according to claim 3, wherein the first and second terminals are located on the peripheral flanges of the upper and lower case bodies, respectively.

5. The battery according to claim 1, wherein the first and second terminals are on opposite sides of the battery.

6. The battery according to claim 1, wherein the electrically conducting metal foil is aluminum.

* * * * *